May 8, 1956     H. ZÖLLNER     2,744,446
SPHERICALLY, CHROMATICALLY AND ASTIGMATICALLY
CORRECTED THREE COMPONENT OBJECTIVE
Filed Feb. 10, 1953
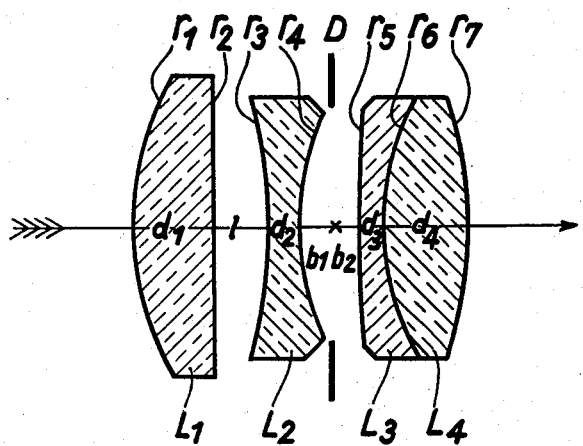
Inventor:
Harry Zöllner

United States Patent Office 2,744,446
Patented May 8, 1956

2,744,446
SPHERICALLY, CHROMATICALLY, AND ASTIGMATICALLY CORRECTED THREE COMPONENT OBJECTIVE

Harry Zöllner, Jena, Germany, assignor to VEB Optik Carl Zeiss Jena, Jena, Germany Application February 10, 1953, Serial No. 367,793

1 Claim. (Cl. 88—57)

The invention consists in an objective of the so-called "Tessar" type for purposes of photography and projection, in which the spherical, chromatic and astigmatic aberrations are eliminated, and which contains a single dispersive lens, enclosed by two axially air-spaced collective members, of which the member on the object side consists of a collective single lens and the member on the image side consists of a two-lens cemented member the cemented surface of which being collective and convex to the object, the objective being constructed of glasses such that the sum of the refractive indices of all lenses lies between 6.42 and 6.53, that the sum of the Abbe numbers of all lenses lies between 185 and 188, that of the front lens and of the rear lens the arithmetic mean of the refractive indices lies between 1.64 and 1.67 and the arithmetic mean of the Abbe numbers lies between 52 and 54, with regard to a focal length of 100 of the objective, the product of this focal length and the quotient of the refractive index of the front lens, reduced by 1, and the radius of curvature of the outside surface of this lens lying between 1.68 and 1.73.

In order to so improve an objective of this type that an aperture f/2.8 combined with a particularly favourable state of correction of the spherical zones and of the chromatic aberrations is attained, the objective according to the present invention is so constructed that the axial distance between the outside surface of the front lens and the front surface of said single dispersive lens lies between 16.4 and 16.6 and, with regard to a focal length of 100 of the objective, the radius of curvature of the cemented surface of said two-lens cemented member lies between 32.2 and 33.

An objective according to the invention is shown as an example in the drawing. The values of the radii $r$, of the thicknesses $d$ and of the air-spaces $l$ of the single lenses L as well as of the aperture spaces $b_1$ and $b_2$ may be chosen for the focal distance $f=100$ according to the following table, representing two examples according to the invention:

EXAMPLE I
[f=100]

| Radii | Thicknesses and Distances |
|---|---|
| $r_1=+\ 39.31$ | $d_1=10.30$ |
| $r_2=\ \infty$ | $l=\ 6.10$ |
| $r_3=-\ 71.04$ | $d_2=\ 2.90$ |
| $r_4=+\ 33.635$ | $b_1=\ 3.95$ |
| $r_5=+763.55$ | $b_2=\ 3.50$ |
| $r_6=+\ 32.967$ | $d_3=\ 2.39$ |
| $r_7=-\ 49.046$ | $d_4=10.00$ |

Kinds of glass

| Lens | $L_1$ | $L_2$ | $L_3$ | $L_4$ |
|---|---|---|---|---|
| $n_d$ | 1.67786 | 1.61200 | 1.57380 | 1.66080 |
| $\nu$ | 55.5 | 37.2 | 42.5 | 50.8 |

EXAMPLE II
[f=100]

| Radii | Thicknesses and Distances |
|---|---|
| $r_1=+\ 37.85$ | $d_1=10.30$ |
| $r_2=\ \infty$ | $l=\ 6.30$ |
| $r_3=-\ 69.57$ | $d_2=\ 2.67$ |
| $r_4=+\ 33.571$ | $b_1=\ 3.96$ |
| $r_5=+109.60$ | $b_2=\ 3.47$ |
| $r_6=+\ 32.23$ | $d_3=\ 2.38$ |
| $r_7=-\ 50.124$ | $d_4=\ 9.62$ |

Kinds of glass

| Lens | $L_1$ | $L_2$ | $L_3$ | $L_4$ |
|---|---|---|---|---|
| $n_d$ | 1.63763 | 1.60435 | 1.57690 | 1.66080 |
| $\nu$ | 55.7 | 38.3 | 41.1 | 50.8 |

I claim:

Three component objective for purposes of photography and projection, this objective being corrected spherically, chromatically and astigmatically and containing a single dispersive lens enclosed by axially air-spaced collective members, the member of the object side consisting of a collective single lens and the member of the image side consisting of two lenses cemented together, the cemented surface being collective and convex to the object, the sum of the refractive indices of all lenses lying between 6.42 and 6.53, the sum of the Abbe numbers of all lenses lying between 185 and 188, the arithmetic mean of the refractive indices of the front lens and of the rear lens lying between 1.64 and 1.67, the arithmetic mean of the Abbe numbers of the front lens and of the rear lens lying between 52 and 54, with regard to a focal length of 100 of the objective, the product of this focal length and the quotient of the refractive index of the front lens, reduced by 1, and the radius of curvature of the outside surface of this lens lying between 1.68 and 1.73, the axial distance between said outside surface and the front surface of said dispersive lens lying between 16.4 and 16.6 and the radius of curvature of said cemented surface lying between 32.2 and 33.

References Cited in the file of this patent
UNITED STATES PATENTS

| | | |
|---|---|---|
| 721,240 | Rudolph | Feb. 24, 1903 |
| 1,558,073 | Bielicke | Oct. 20, 1925 |
| 2,084,714 | Tronnier | June 22, 1937 |
| 2,573,512 | Tronnier | Oct. 30, 1951 |

FOREIGN PATENTS

| | | |
|---|---|---|
| 609,669 | Great Britain | Oct. 5, 1948 |